United States Patent Office 3,353,960
Patented Nov. 21, 1967

3,353,960
PROCESS FOR PRODUCING BREWERS' WORT WITH ENZYMES
Vincent S. Bavisotto, Whitefish Bay, Wis., assignor to Chas. Pfizer & Co., Inc., New York, N.Y., a corporation of Delaware
No Drawing. Filed Nov. 1, 1966, Ser. No. 591,136
8 Claims. (Cl. 99—52)

ABSTRACT OF THE DISCLOSURE

In the production of brewers' wort, addition of proteolytic enzyme to the malt (0.1–1.0% by weight based on weight of malt) permits the satisfactory use of malt:adjunct ratios as low as 40:60. Diastatic enzyme and/or high diastatic malt is preferably added to the mash when malt:adjunct ratio is 45:55 or less. Proteolytic rest period can be reduced or eliminated by employing certain elevated mash temperatures.

---

This application is a continuation-in-part of my earlier filed, pending application Ser. No. 446,383, filed Apr. 7, 1965, which is in turn a continuation-in-part of application Ser. No. 305,546, filed Aug. 29, 1963, and now abandoned.

This invention relates to the production of brewers' wort for use in the manufacture of non-distilled fermented beverages such as beer, ale lager, and the like. More particularly, it relates to the production of brewers' wort and the fermented product obtained therefrom.

In the manufacture of beer and ale by the fermentation of cereals, such as barley, the cereal is subjected to a mashing process followed by a fermentation process. In the manufacture of beer, for example, malted barley is traditionally used. Malted barley is made by the germination of the barley, removal of the germ after drying, and crushing of the remaining grain. The malted barley is mixed with some other grain, such as crushed corn or rice, and the mixture is treated with hot water at 70° to 74° C. so that the amylase from the malted barley converts the starch of the grains into dextrins and fermentable sugars. The filtrate from this mixture is called the "wort," and the residue is referred to as spent brewers' grain. The process as carried out to this point is often referred to as mashing.

The wort is admixed with hops and boiled. The heat stops the action of the amylase and sterilizes the wort, while the extraction of the hops provides constituents which are flavor-producing and preservative. The wort is thereafter cooled and subjected to fermentation by the addition of brewers' yeast, *Saccharomyces cerevisiae*, or the like. A "bottom yeast" is usually used in beer manufacture and a "top yeast" for ale. A top yeast is one in which the cells gather in clumps and are carried to the top of the fermenting liquid by gas caught in the clumps, while the cells of a bottom yeast stay fairly well separated and settle toward the bottom. The yeast utilizes the normally fermentable sugars which are part of the wort medium. The primary fermentation of the beer wort occurs at about 7° to 14° C. and ordinarily takes from seven to nine days. This is followed by the secondary or "lager" fermentation at 0° to 4° C. for two to six weeks or longer. Thereafter, the beer is clarified or filtered, carbonated and packaged.

It is known that brewers' wort is made from a mash of malt and adjuncts such as prepared cereals, unmalted raw cereals, cereal grains such as corn and rice or other carbohydrate source. Unmodified starches, such as raw corn grits, must be precooked in a separate cooker before being added to the mash. This is generally done by mixing them with water and finely ground malt. Said malt liquefies the starch material, thus enabling the complete conversion of starch to sugar in the main mash.

Heretofore, the generally acceptable mash in the brewing industry for making beer, for example, was made up of about 65% malt and about 35% adjunct (corn) based on the total weight of malt and adjunct.

In some instances, mashes utilizing about 60% malt and about 40% adjunct (corn) have been used successfully. Based upon a malt:adjunct ratio of 65:35 the brewing industry is able to set up a standardized brewing schedule, obtain consistent results in their product, and obtain a beer of desirable taste, body, stability, chemical composition, color, etc. The disadvantage of using a 65:35 (malt:adjunct) mash lies in the cost involved, particularly with respect to the cost of malt.

It is known in the art that enzymes may be used in brewing. Nugey, for example, U.S. 2,790,718, describes the addition of enzymes to a raw cereal-water mixture followed by heating said mixture to at least 100° C. to gelatinize and liquefy the cereal. The entire mass (cooker mash) is then combined with a main malt mash to finish the beer. Dennis et al., in U.S. 3,081,172, replaces malt as the primary enzymatic agent by the addition of diastatic and proteolytic enzymes to a raw cereal mash, such as unmalted barley, which may contain up to 10% malt if desired. In both instances, however, raw or unmalted cereals are utilized.

The Nugey process completely inactivates the enzymes present at the elevated temperatures used with the result that when the cooker mash is added to the main malt mash no active enzymes are present in the cooker mash. The Dennis et al. process is not used in the contemporaneous brewing industry.

The novel process of the present invention, on the other hand, is specifically designed for present-day brewing techniques and uses conventional brewing materials, i.e., malt and cereal adjunct. The salient feature of this process resides in the fact that it is the only method which allows the present-day brewer to lower the malt to adjunct ratios below the 65:35 or 64:40 ratios now in use throughout the brewing industry and still produce a beer of at least comparable quality and at lower cost. Reduction of the malt level below that normally used in the present-day brewing operations introduces nutrional deficiences which contributes to the development of diacetyl during fermentation. Indeed, this relationship becomes increasingly significant at low malt levels resulting in beer of poor quality. Prior to the present invention beer made with malt to adjunct ratios other than 65:35 or 60:40 were characterized by sub-optimal nitrogen balance particularly as regards the formol nitrogen fraction. Such an imbalance in turn affected yeast nutrition, brewing yield and increased diacetyl formation.

It has now been found that by adding specific enzymes to the mash, a mash comprising 50:50 (malt:adjunct) ratio may be used in brewing. Such a mash produces a beer of desirable taste, body, stability, chemical composition, color, etc. comparable to and in some instances better than a beer produced from a 65:35 mash.

In a normal brewing operation any unmodified starches, such as corn grits, for example, are added to brewing water, placed in a cereal cooker and heated at about 70° C. for about 30 minutes. The mixture is thereafter brought to boiling and held there for about 10 minutes. The corn grits are completely liquefied by this treatment. To avoid high viscosity in the cooker, about 10% of the total malt may be added to the corn grits. In accordance with the present invention the enzyme formulation is added to the mash tun which contains the malt and brewing water. This mixture is held at about 37° C. for about one hour. At the end of this period, the proteolytic rest period, normal procedures are followed, i.e., the liquefied corn grits are added to the mash tun, the temperature is raised to about 70° C., and the mixture held at this temperature for an additional one-half to one hour. The gelatinized starch is converted into readily fermentable sugars and dextrine by cereal (diastatic) enzymes present in the malt.

It has further been found that the proteolytic rest time can be reduced significantly by the expedient of raising the mash temperature to up to about 70° C. The standard proteolytic rest period is about 60 minutes at about 37° C. The present novel process permits significant reduction and, by raising the mash temperature to about 60–70° C., even elimination of the proteolytic rest period. This novel and surprising improvement is applicable to batch and continuous brewing processes. The worts produced have approximately the same levels of total nitrogen and formol nitrogen as do worts produced by the standard procedures now in use in the brewing industry.

At mash temperatures of about 35° to about 60° C. a proteolytic rest period is used. That is, when operating within this temperature range the mash is raised to and held at a temperature of about 35° to about 60° C. for a given period. The duration of the proteolytic rest period decreases as the temperature increases as is illustrated herein. At the upper temperature levels of this novel process, e.g. 60° to 70° C., the proteolytic rest period can be eliminated. The mash, after being raised to this temperature level, is not held at said temperature but is passed directly to the next phase of the process in a continuous operation. For the purposes of this invention the use of a brief proteolytic rest period, e.g. up to about 10 minutes, may be considered the equivalent of a continuous process.

The "come-up" time, that is, the time required to raise the temperature of the mash to the desired levels of this novel process, depends, of course, upon the equipment, the volume of material and the temperature level used. The duration of the come-up time is not critical. As is obvious, the higher the temperature to which the mash is raised the longer the come-up time. In general, when operating at a mash temperature of about 60° to about 70° C. a come-up time of about 15 minutes is required.

It is to be noted that, heretofore, all enzymatic activity was due to the cereal (diastatic) enzymes and proteolytic enzymes present in the malt. This activity was satisfactory for producing a desirable beer as long as the malt to adjunct ratio was about 65:35 and even as low as 60:40. However, it was found that when the ratio dropped to about 55:45 and even lower levels of malt, satisfactory beers were not obtained, and additional enzymes had to be added to the mash. If additional enzyme was not added to the mash several undesirable results were manifested such as unduly long conversion time, significantly lower extract yield, and lower nitrogen levels.

Following conversion of gelatinized starch to fermentable sugars and dextrins, the procedure is thereafter one which is generally practiced in the art, namely, the worts are transferred to a boiling kettle, hops are added, and the worts are concentrated by boiling. The worts are thereafter aerated and "pitched" at 12° C. with brewing yeast. After the worts are pitched, they are placed in fermentation vessels and allowed to ferment at about 13° C. After fermentation the beers are removed to colder (0° C.) storage for yeast settling. Following yeast settling the beers are decanted and placed in ruh storage for 5 to 7 days at about 0° C. Thereafter, the beers are filtered, finished and bottled.

This invention applies to a normal brewing operation. Whereas heretofore the ratio of malt to adjunct was substantially 65:35 in the mash tun, or unmalted cereal grains plus an added enzyme comprised the mash, the instant invention comprises replacing part of the malt with an added enzyme. The process is limited to the use of malted cereal and adjuncts.

It is to be understood that the ratio of malt to adjunct in the instant invention need not be limited to 50:50. Ratios as low as 40:60 (malt:adjunct) and as high as 55:45 may be employed; however, it is preferred that as the ratios drop to 45:55 and below, in addition to the proteolytic enzyme, the diastatic activity be supplemented, for example, by the addition of a diastatic enzyme, such as bacterial amylase, or by the addition of high diastatic malt or both. An example of high diastatic malt is distillers' malt (a diastatic power (DP) of 190–250° Lintner, alpha amylase (aa) of 50–70 units). The malt generally used in the manufacture of beer is brewers' malt (a diastatic power (DP) of 120–140° Lintner, alpha amylase (aa) of 25–40 units).

Enzymes which have been found to be satisfactory include proteolytic enzymes such as papain, ficin, bromelain, pancreatin, and proteases, such as fungal and bacterial proteases. A satisfactory amount of enzyme to be used is from about 0.10% to about 1.0% by weight based on the weight of malt. An optimum amount of enzyme for a 50:50 brew is about 0.16% by weight. The enzymes may be used.

The mash, containing malt and enzyme, is held at a temperature of from about 35° C. to about 70° C. for a period of up to about 90 minutes. As previously noted, the duration of this period, the proteolytic rest period, can be markedly reduced even to the point of elimination by raising the temperature of the mash. At temperatures of about 60° to about 70° C., for example, the proteolytic rest period can be reduced to about 10 minutes or less as is exemplified herein. Following the addition of the liquefied corn to the mash, the temperature is then raised to from about 65° C. to about 75° C. and held at that temperature for a period of from about 30 minutes to about 60 minutes.

The invention may be more fully understod by reference to the following examples. It is to be understood that the examples are merely for illustration and are not limitations thereof.

*Example I (50:50 ratio malt to corn)*

Corn grits (188 g.) and brewers' malt (18.8 g.) are added to 700 ml. of brewing water [1] and the whole is added to a cooker. The cooker is brought to 70° C. and held at this temperature for 30 minutes. The cooker is then brought to 95° to 100° C. and held at this temperature for 10 minutes. The corn grits are liquefied by this treatment.

To the mash tun are added 168.3 g. of brewers' malt, 0.9 g. dark caramel malt, 0.3 g. papain (1000 Hb units/g.)[2] and 700 ml. brewing water. The mash is brought to 37° C. and held there for 60 minutes (proteolytic rest period). The liquefied corn is then added to the mash and the temperature is increased to 70° C. and held there for 45 minutes. The mash is lautered and sparged with 1600 ml. of brewing water. Following lautering and sparging the worts are transferred to the kettle. Three grams of hops are added to the kettle and the worts are concentrated to a volume of 2000 ml. by boiling. The worts are cooled to 20° C. by circulation through cooling coils, are aerated, and "pitched" at 12° C. with brewers' yeast, *Saccharomyces cerevisiae*. The worts are stored in glass fermentation vessels and allowed to ferment at 13.5° C. After 5 days the beers are removed and placed in cold storage (0° C.) for yeast settling. After the yeast has settled, the beers are decanted off the yeast and placed in ruh storage for 5 to 7 days at 0° C. At the end of ruh storage, the beers are subjected to chemical analysis and taste testing.

*Example II*

The procedure of Example I is followed using ficin as the added enzyme.

*Example III*

The procedure of Example I is followed using bromelain as the added enzyme.

---
[1] Brewing water composition—to 12 liters of water add 5 ml. 50% lactic acid (edible grade) and 6 g. Burton salts.
[2] Hemoglobin (Hb) units per gram—modified Anson's hemoglobin method.

Example IV

Ruh beers from Examples I, II and III are analyzed for chemical composition and the results are compared to a beer made from a 65:35 malt:adjunct mash.

|  | Ex. I | Ex. II | Ex. III | 65:35 Brew |
|---|---|---|---|---|
| Color, Lovibond | 2.27 | 2.25 | 2.30 | 2.16 |
| Apparent Extract, percent | 2.86 | 2.86 | 2.88 | 2.66 |
| Real Extract, percent | 4.69 | 4.61 | 4.64 | 4.55 |
| Alcohol by weight, percent | 3.79 | 3.66 | 3.66 | 3.84 |
| Alcohol by volume, percent | 4.85 | 4.68 | 4.68 | 4.91 |
| Original Extract, percent | 12.0 | 11.7 | 11.7 | 12.0 |
| Real Degree of Fermentation, percent | 61.1 | 60.7 | 60.4 | 62.3 |
| Apparent Degree of Fermentation, percent | 76.0 | 75.6 | 75.5 | 77.6 |
| Acidity, percent | 0.13 | 0.12 | 0.12 | 0.13 |
| pH | 4.4 | 4.4 | 4.5 | 4.5 |
| Reducing Sugars, percent as maltose | 0.99 | 1.04 | 0.99 | 0.90 |
| Dextrins, percent | 3.05 | 2.88 | 2.98 | 2.91 |
| Total Protein percent (N x 6.25) | 0.33 | 0.38 | 0.35 | 0.35 |

Example V

The procedure of Example I is repeated using varying amounts of papain (percent based on weight of malt). The chemical compositions of the ruh beers are listed below:

|  | Percent Enzyme Added to Mash | | |
|---|---|---|---|
|  | Ex. I, 0.16 | 0.24 | 0.32 |
| Color, Lovibond | 2.27 | 2.08 | 2.22 |
| Apparent Extract, percent | 2.86 | 2.43 | 3.26 |
| Real Extract, percent | 4.69 | 4.30 | 5.05 |
| Alcohol by weight, percent | 3.79 | 3.98 | 3.80 |
| Alcohol by volume, percent | 4.85 | 5.08 | 4.87 |
| Original Extract, percent | 12.0 | 12.1 | 12.4 |
| Real Degree of Fermentation, percent | 61.1 | 64.3 | 59.3 |
| Apparent Degree of Fermentation, percent | 76.0 | 76.8 | 72.5 |
| Acidity, percent | 0.13 | 0.13 | 0.14 |
| pH | 4.4 | 4.5 | 4.5 |
| Reducing Sugars, percent as maltose | 0.99 | 0.88 | 1.04 |
| Dextrins, percent | 3.05 | 2.76 | 3.25 |
| Total Proteins, percent (N x 6.25) | 0.33 | 0.34 | 0.41 |

Example VI

Worts obtained by the procedure of Example I using various enzymes are analyzed and compared with the worts obtained from a 65:35 malt:corn mash. The results are as follows:

|  | Type of Enzyme Used in the Mash | | | | | | |
|---|---|---|---|---|---|---|---|
|  | Papain | Ficin | Bromelain | Pancreatin | Fungal Protease | Bacterial Protease | 65:35 Brew |
| Conversion Time, min. at 70° C | 40 | 41 | 40 | 41 | 60 | 40 | 39 |
| Balling, Plato | 12.1 | 11.9 | 11.9 | 10.4 | 11.7 | 12.2 | 11.9 |
| Total Protein, Percent (N x 6.25) | 0.53 | 0.54 | 0.52 | *NC | 0.51 | 0.41 | 0.54 |
| Enzyme Conc., percent based on weight of malt | 0.16 | 0.16 | 0.16 | 0.34 | 0.16 | 0.16 | None |
| Enzyme activity, Hb units/gram | 1,000 | 1,000 | 1,000 | 2,048 | 1,000 | 19 | None |

*NC—not calculated.

Example VII (40:60 ratio malt to corn)

Corn grits (250 g.) and brewers' malt (16.7 g.) are added to 900 ml. brewing water, and the whole is added to the cooker. The cooker is brought to 70° C. and held at that temperature for 30 minutes. The cooker is then brought to 95°–100° C. and held at this temperature for 10 minutes. The corn grits are liquefied by this treatment. To the mash tun are added 121.3 g. brewers' malt, 29 g. high diastic malt (240° Lintner), 25 g. soya flakes, 0.56 g. papain (1000 Hb units/g.), 0.066 g. bacterial amylase (35,000 D.V. units/g.)[3], 4 g. malt syrup and 500 ml. brewing water. The mash is brought up to 37° C. and held at that temperature for 60 minutes. The liquefied corn is then added to the mash, and the temperature increased to 70° C. and held for 45 minutes. The mash is lautered and sparged with 1600 ml. brewing water.

The worts are thereafter treated in the same manner as set forth in Example I.

[3] D.V.—dextrinizing value.

Example VIII

The chemical composition results of ruh beers made from a malt to corn ratio of 40:60 are compared with those made from a malt to corn ratio of 50:50 and 65:35:

|  | Malt to Corn Ratio | | |
|---|---|---|---|
|  | 40:60 | 50:50 | 65:35 |
| Color, Lovibond | 2.40 | 2.27 | 2.16 |
| Apparent Extract, percent | 2.97 | 2.86 | 2.66 |
| Real Extract, percent | 4.76 | 4.69 | 4.55 |
| Alcohol, weight, percent | 3.72 | 3.79 | 3.84 |
| Alcohol, volume, percent | 4.76 | 4.85 | 4.91 |
| Original Extract, percent | 12.0 | 12.0 | 12.0 |
| Real Degree of Fermentation, percent | 60.3 | 61.1 | 62.3 |
| Apparent Degree of Fermentation, percent | 73.0 | 76.0 | 77.6 |
| Acidity, percent | 0.13 | 0.13 | 0.13 |
| pH | 4.2 | 4.4 | 4.5 |
| Reducing Sugars, percent as maltose | 0.97 | 0.99 | 0.90 |
| Dextrins, percent | 3.16 | 3.05 | 2.91 |
| Total protein, percent (N x 6.25) | 0.30 | 0.33 | 0.35 |
| Papain, percent (1000 Hb units/g.)[1] | 0.48 | 0.16 | 0.00 |
| Bacterial amylase, percent[2] | 0.013 | 0.00 | 0.00 |

[1] Based on weight of malt. Added to mash.
[2] Based on weight of corn. Added to mash.

Taste tests were conducted on beers after one week in ruh. The 50:50 beers gave a slightly higher preference score than did the 65:35 beers. In general, all beers were found to be clean and neutral in aroma. All had light to moderate body and mild to moderate hop character and were very acceptable for ruh beers. The significantly lower level of malt in the 50:50 beers resulted in a slightly lighter color than traditional beers. This may be compensated for by substituting different types of caramel malts such as black roasted malt (0.05%), dark caramel malt (0.5%), medium caramel malt (3%), light caramel malt (5%) and malt syrup (1.6%) for part of the regular malt. The percentages of the various caramel malts cited above are based on the weight of total malt. Flavor was not affected by the addition of the caramel malts.

At malt levels of 45% and below, malt syrup may be added to augment flavor as well as color.

In finished beers made thus far in breweries, it was found that beer flavor, chill haze and foam properties, were found to be comparable for the 50:50 beer and the control. The colloidal stability of the 50:50 beers was found to be superior to the controls both at low temperatures and at room temperatures.

Example IX

The procedure of Example I is repeated but using 0.16% ficin (1100 Hb units/g.) as the added enzyme based on the weight of the malt and the following modifications in proteolytic rest period conditions. Pertinent data comparing the worts from these batches with that from a batch run under standard proteolytic rest conditions (60 minutes at 37.5° C.) are recorded.

| Proteolytic Rest | | Original Extracts, percent | Gm. N/100 ml., Wort | Gm. Formol N/100 ml., Wort |
|---|---|---|---|---|
| Temp. (° C.) | Time (min.) | | | |
| 37.5 | 60 | 10.2 | .0704 | .0271 |
| 44.0 | 45 | 10.3 | .0722 | .0297 |
| 44.0 | 30 | 10.2 | .0678 | .0280 |
| 56.0 | 30 | 10.1 | .0678 | .0291 |

These data clearly demonstrate that the proteolytic rest period can be significantly reduced by raising the mash temperature. In each instance approximately the same levels of total nitrogen and formol nitrogen are present in the worts.

*Example X*

This example illustrates the production of worts by the procedure of Example I using different levels of ficin (1100 Hb units/g.) as the added enzyme, a mash temperature of 70° C. and no proteolytic rest period. Pertinent data are recorded below.

| Percent Ficin | Proteolytic Rest | Original Extracts | Gm. N/100 ml., Wort | Gm. Formol N/100 ml., Wort |
|---|---|---|---|---|
| 0.25 | | 11.0 | 0.0913 | 0.039 |
| 0.50 | | 11.0 | 0.1025 | 0.0425 |
| Control | 37.5° C., 60 minutes | 11.0 | 0.0840 | 0.041 |

The nitrogen values in this example are higher due to the use of a malt blend brewed to a higher extract level.

Similar results are obtained at a mash temperature of 65° C. and no proteolytic rest and at proteolytic rest conditions of 55° C. for about 20 minutes; 60° C. for about 10 minutes.

*Example XI*

The procedure of Example I is followed, two batches being run. In one batch, A, no proteolytic enzyme is added while in the second batch, B, 0.16% papain by weight is added. The beers thus produced give the following results upon analysis.

| | A | B |
|---|---|---|
| Color, Lovibond | 3.85 | 3.50 |
| Apparent Extract, percent | 2.61 | 2.62 |
| Real Extract, percent | 4.24 | 4.46 |
| Alcohol, weight, percent | 3.46 | 3.60 |
| Alcohol, volume, percent | 4.42 | 4.60 |
| Original Extract, percent | 11.0 | 11.5 |
| Real Degree of Fermentation, percent | 61.5 | 61.2 |
| Apparent Degree of Fermentation, percent | 76.3 | 77.2 |
| Acidity, percent | 0.13 | 0.12 |
| pH | 4.25 | 4.4 |
| Reducing Sugars, percent, as maltose | 1.00 | 0.87 |
| Dextrins, percent | 2.64 | 2.89 |
| Total protein, percent (N x 6.25) | 0.27 | 0.38 |
| Diacetyl (p.p.m.) | 0.41 | 0.27 |

The beer produced without the addition of proteolytic enzyme thus shows two distinct abnormalities, low protein content and high diacetyl content whereas that produced with papain compares favorably with beers made with a malt to corn ratio of 65:35.

What is claimed is:

1. In a process for making beer the improvement in preparing the wort which comprises the steps of adding proteolytic enzyme to a malt mash, in amounts of from about 0.1% to about 1.0% by weight based on the weight of the malt, raising the enzyme-containing mash to a temperature of about 35° C. to about 70° C., maintaining said temperature for a period of from about 10 minutes up to about 90 minutes, thereafter adding liquefied cereal grain to said enzyme-containing mash in a proportion of from about 45% to about 60% by weight based on the total weight of malt and cereal grain, raising the temperature of the entire mass to about 65° C. to 75° C. and maintaining the latter temperature for a period of from about 30 minutes to about 60 minutes.

2. A process as defined in claim 1 wherein the said enzyme is selected from the group consisting of papain, ficin, bromelain, pancreatin, fungal protease, bacterial protease and mixtures thereof.

3. A process as in claim 1 wherein diastatic enzyme is included with said proteolytic enzyme whenever said cereal grain level is at least 55%.

4. A process as defined in claim 1 wherein from about 0.16% to about 0.25% by weight of a proteolytic enzyme based on the weight of malt is added to a malt mash, and wherein the proportion of liquefied cereal grain to said enzyme-containing mash is about 50%.

5. A process as defined in claim 4 wherein said proteolytic enzyme is papain.

6. A process as defined in claim 4 wherein said proteolytic enzyme is ficin.

7. A process as defined in claim 4 wherein said proteolytic enzyme is bromelain.

8. In a process for making beer the improvement in the continuous production of wort which comprises the steps of adding proteolytic enzyme to a malt mash, raising the enzyme-containing mash to a temperature of about 60° C. to about 70° C., thereafter adding liquefied cereal grain to said enzyme-containing mash in a proportion of from about 45% to about 60% by weight based on the total weight of malt and cereal grain, raising the temperature of the entire mass to about 65° C. to 75° C. and maintaining the latter temperature for a period of from about 30 minutes to about 60 minutes.

References Cited

UNITED STATES PATENTS

| 1,737,279 | 11/1929 | Wallerstein | 195—14 X |
| 2,790,718 | 4/1957 | Nugey | 99—50 |
| 3,055,757 | 9/1962 | Segel | 99—31 |
| 3,081,172 | 3/1963 | Dennis et al. | 99—50 |

OTHER REFERENCES

Nugey, A. L., Brewers Manual, Jersey Printing Co., Inc., New Jersey, TP N8, 1948 (page 9).

A. LOUIS MONACELL, *Primary Examiner.*

D. M. NAFF, *Assistant Examiner.*